United States Patent [19]

Sands

[11] Patent Number: 5,054,236
[45] Date of Patent: Oct. 8, 1991

[54] CHRISTMAS TREE SELF-WATERING ORNAMENT

[76] Inventor: Katie M. Sands, RD #7 Box 456, Tunkhannock, Pa. 18657-9324

[21] Appl. No.: 459,247
[22] Filed: Dec. 29, 1989
[51] Int. Cl.$^5$ ............................................. A01G 25/00
[52] U.S. Cl. ...................................................... 47/79
[58] Field of Search ........................... 47/67, 48.5, 79; 137/429, 430, 433, 449

[56] References Cited

U.S. PATENT DOCUMENTS

| | | | |
|---|---|---|---|
| 1,231,976 | 7/1917 | Weitzel | 137/433 |
| 2,684,077 | 7/1954 | Shaffer | 137/433 |
| 2,938,495 | 8/1957 | Hinton | 47/79 |
| 3,564,233 | 2/1971 | Cox | 362/32 |
| 3,667,464 | 6/1972 | Alligood, Jr. | 137/433 |
| 3,799,186 | 3/1974 | Bulin | 137/433 |
| 4,850,137 | 7/1989 | Foster | 47/79 |

Primary Examiner—David A. Scherbel
Assistant Examiner—Michele A. Van Patten
Attorney, Agent, or Firm—Leon Gilden

[57] ABSTRACT

A self-watering device is set forth wherein a reservoir includes a conduit associated therewith. The conduit optionally includes a valve at a lowermost end thereof with a check ball captured between spaced webs for permitting selective passage of water therethrough to an associated plant, such as a Christmas tree. The device further includes a lid securable over the reservoir with a fluid level indicator directed slidably through the lid, and optionally includes a coiled outlet conduit of translucent character capturing a fiber optic cable therethrough for enhanced use as an ornament. The ornament may further include a modified lid of a funnel configuration that is inverted for use in a filling procedure of the reservoir.

3 Claims, 4 Drawing Sheets

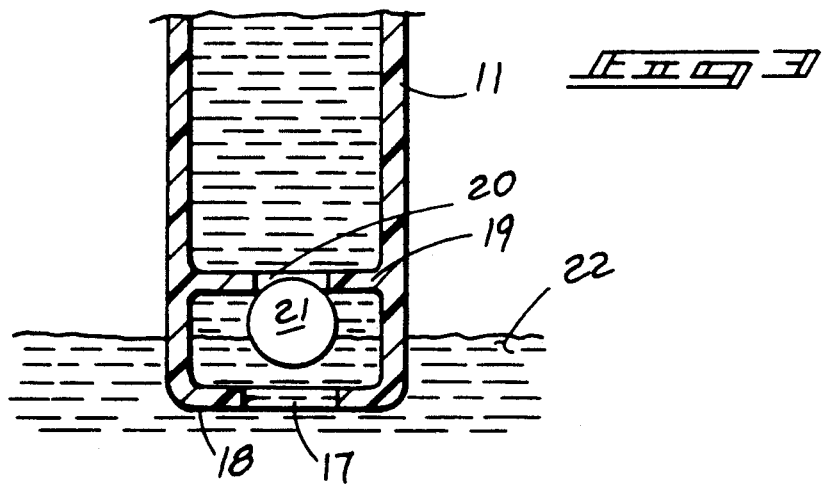
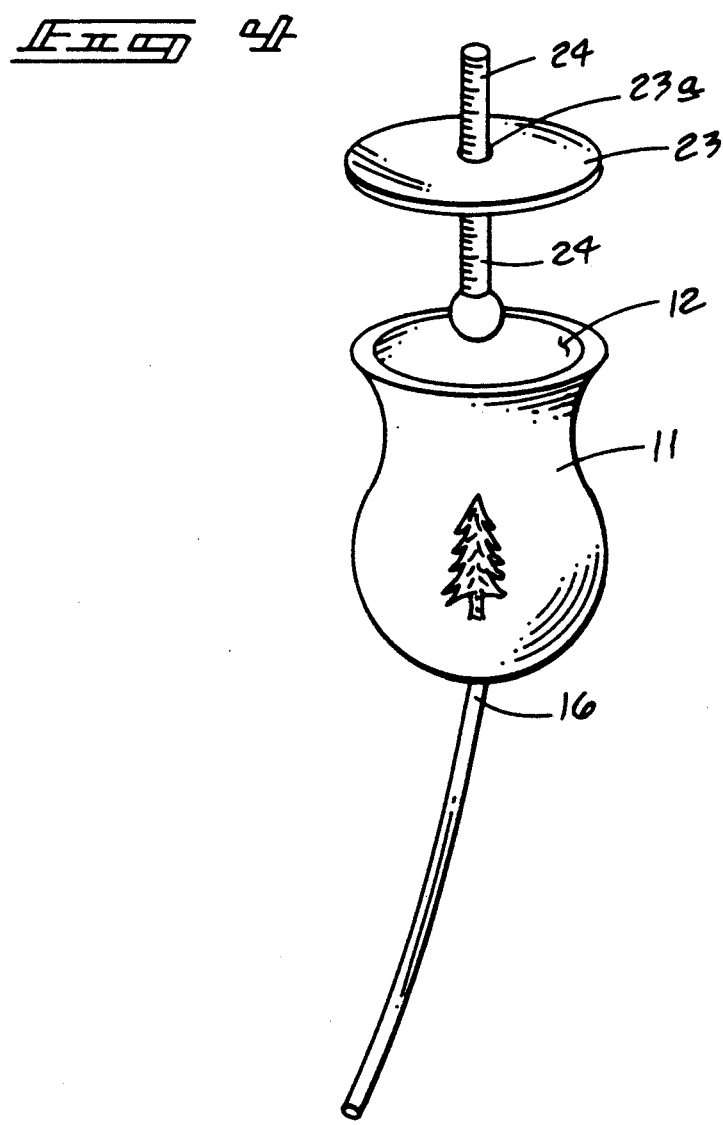

CHRISTMAS TREE SELF-WATERING ORNAMENT

BACKGROUND OF THE INVENTION

1. Field of the Invention

The field of invention relates to Christmas tree ornaments, and more specifically pertains to a new and improved Christmas tree self-watering ornament wherein the same selectively directs water to replenish a Christmas tree or a plant in use.

2. Description of the Prior Art

Plant watering devices of various types are known in the prior art. Plant watering during the Christmas season is particularly significant in that due to typically colder temperatures exteriorly of a dwelling with the securement and positioning of a Christmas tree interiorly of that dwelling, relative humidities are extremely low with attendant rapid drying of Christmas trees. Further, Christmas trees are typically cut and transported many weeks prior to their sale and accordingly are already in a state of water need. Examples of the prior art include U.S. Pat. No. 3,505,760 to Ambrose wherein a funnel shaped device is secured to bracketry associated with a Christmas tree for enabling a directing of water therewithin.

U.S. Pat. No. 1,842,687 to Raynolds sets forth a watering device securable interiorly of a vessel with a rigid bulb and reservoir directed medially of the vessel to direct fluid therein.

U.S. Pat. No. 4,060,934 to Skaggs provides a self-watering plant device wherein a remote bracketry positions a reservoir in a spaced relationship relative to a plant with a flexible hose directed from the reservoir to the plant.

U.S. Pat. No. 4,760,666 to Han sets forth a watering device for plants wherein a reservoir mounted on a bracket positioned overlying a plant directs fluid to the plant, wherein water is directed to the plant upon the plant losing weight due to moisture loss and simultaneously opening a valve to direct water to the plant.

U.S. Pat. No. 3,357,129 sets forth a plant watering device wherein a rigid plant conduit reservoir mechanism is positioned relative to the plant utilizing an adjustment valve to meter flow thereto.

As such, it may be appreciated that there is a continuing need for a new and improved Christmas tree self-watering ornament wherein the same addresses both the problems of ease of use and effectiveness in selectively directing water to the associated tree and in this respect, the present invention substantially fulfills this need.

SUMMARY OF THE INVENTION

In view of the foregoing disadvantages inherent in the known types of self-watering plant devices now present in the prior art, the present invention provides a Christmas tree self-watering ornament wherein the same includes a reservoir and an optional metering system to direct water to a plant while blending in with ornamentation associated with the tree. As such, the general purpose of the present invention, which will be described subsequently in greater detail, is to provide a new and improved Christmas tree self-watering ornament which has all the advantages of the prior art self-watering plant devices and none of the disadvantages.

To attain this, the present invention comprises a self-watering device wherein a reservoir includes a conduit associated therewith. The conduit optionally includes a valve at a lowermost end thereof with a check ball captured between spaced webs for permitting selective passage of water therethrough to an associated plant, such as a Christmas tree. The device further includes a lid securable over the reservoir with a fluid level indicator directed slidably through the lid, and opertionally includes a coiled outlet conduit of translucent character capturing a fiber optic cable therethrough for enhanced use as an ornament. The ornament may further include a modified lid of a funnel configuration that is inverted for use in a filling procedure of the reservoir.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Christmas tree self-watering ornament which has all the advantages of the prior art self-watering plant devices and none of the disadvantages.

It is another object of the present invention to provide a new and improved Christmas tree self-watering ornament which may be easily and efficiently manufactured and marketed.

It is a further object of the present invention to provide a new and improved Christmas tree self-watering ornament which is of a durable and reliable construction.

An even further object of the present invention is to provide a new and improved Christmas tree self-watering ornament which is susceptible of a low cost of manufacture with regard to both materials and labor, and which accordingly is then susceptible of low prices of sale to the consuming public, thereby making such Christmas tree self-watering ornaments economically available to the buying public.

Still yet another object of the present invention is to provide a new and improved Christmas tree self-watering ornament which provides in the apparatuses and methods of the prior art some of the advantages thereof, while simultaneously overcoming some of the disadvantages normally associated therewith.

Still another object of the present invention is to provide a new and improved Christmas tree self-watering ornament wherein the same selectively directs water to an associated tree while blending in with typical ornamentation associated with a Christmas tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional orthographic view of the metering system utilized by the instant invention in a closed orientation.

FIG. 4 is an isometric illustration of a water level indicating device utilized by the instant invention.

DESCRIPTION OF THE PREFERRED EMBODIMENT

Figure 1:
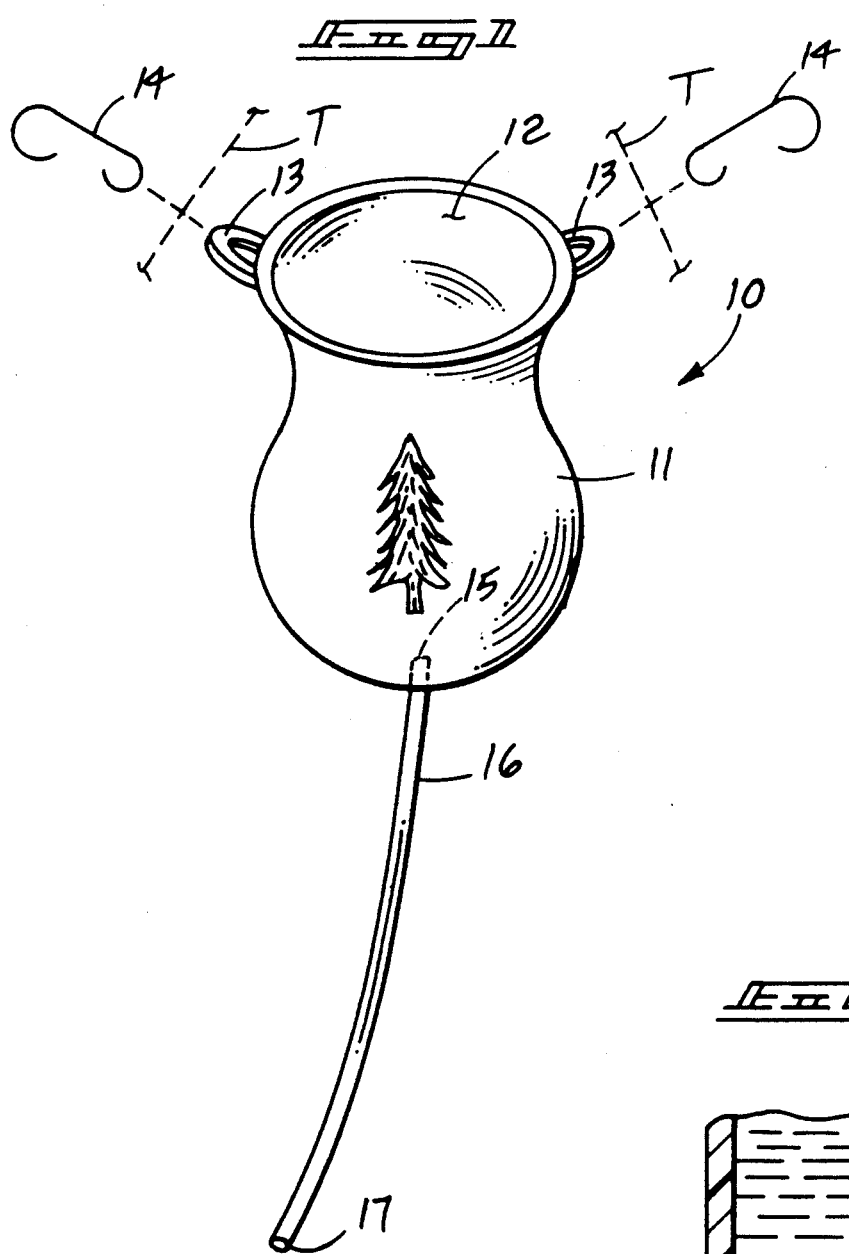
FIG. 1 is an isometric illustration of the instant invention.
Figure 2:
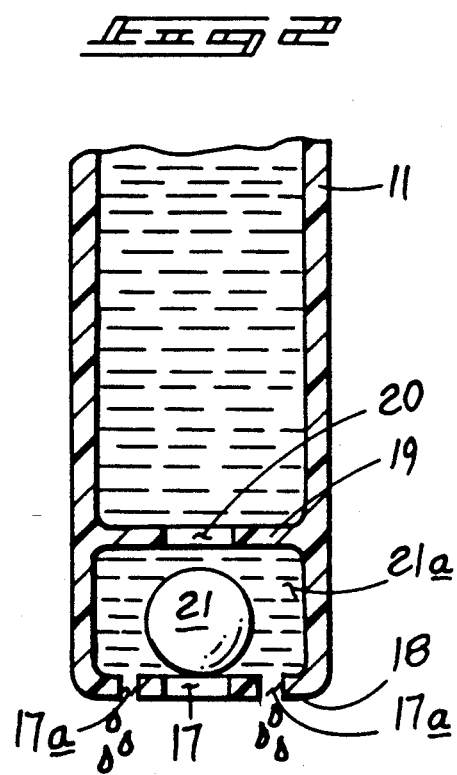
FIG. 2 is an othographic cross-sectional view of a metering system utilized by the conduit of the instant invention in an open position.

With reference now to the drawings, and in particular to FIGS. 1 to 8 thereof, a new and improved Christmas tree self-watering ornament embodying the principles and concepts of the present invention and generally designated by the reference numerals 10 and 10a will be described.

More specifically, the Christmas tree self-watering ornament 10 essentially comprises an elongate axially symmetrical reservoir 11 defined by an open mouth 12 at its upper end defined by a predetermined diameter. A plurality of "U" shaped handles 13 are positioned adjacent the open mouth 12 diametrically opposed relative to one another to receive "C" shaped clips 14 for securement of the device 10 to an associated Christmas tree "T", illustrated in phantom. A coaxially aligned aperture 15 positioned through a bottom floor of the reservoir 11 includes a flexible conduit 16 fixedly associated therewith defined by a lower outlet opening 17. The lower outlet opening 17 is medially defined through a lower web 18 orthogonally oriented relative to the conduit 16 with an upper web 19 spaced below the lower web 18, with an upper web outlet 20 medially positioned through upper web 19 aligned with the lower outlet 17. A check ball 21 defined by a check ball diameter defines a measurement less than that defined by the spacing between the upper and lower webs 19 and 18 respectively and is received within the chamber 21a thusly defined between the upper and lower webs. The check ball 21 is defined by a specific gravity less than that of water to effect a buoyancy within the check ball, whereupon in a normal configuration, as illustrated in FIG. 3, the check ball 21 overlies the upper web outlet 20 to cease flow to an associated fluid level 22 arranged exteriorly of the conduit 11, whereupon a lowering of the fluid level 22 below the lower web 18, the check ball 21 will drop to permit fluid flow through an annular array of peripheral openings 17a as the check ball 21 rests upon the aperture 17 for positioning thereof.

FIG. 4 is illustrative of the device 10 in combination with a lid 23 defined by the predetermined diameter of the open mouth 12 for securement therewithin, with a lid aperture 23a directed axially through the lid 23. A graduated buoyancy rod 24 is slidably mounted through the aperture 23a for visual indication of fluid level within the reservoir 11 in use.

Figure 5:
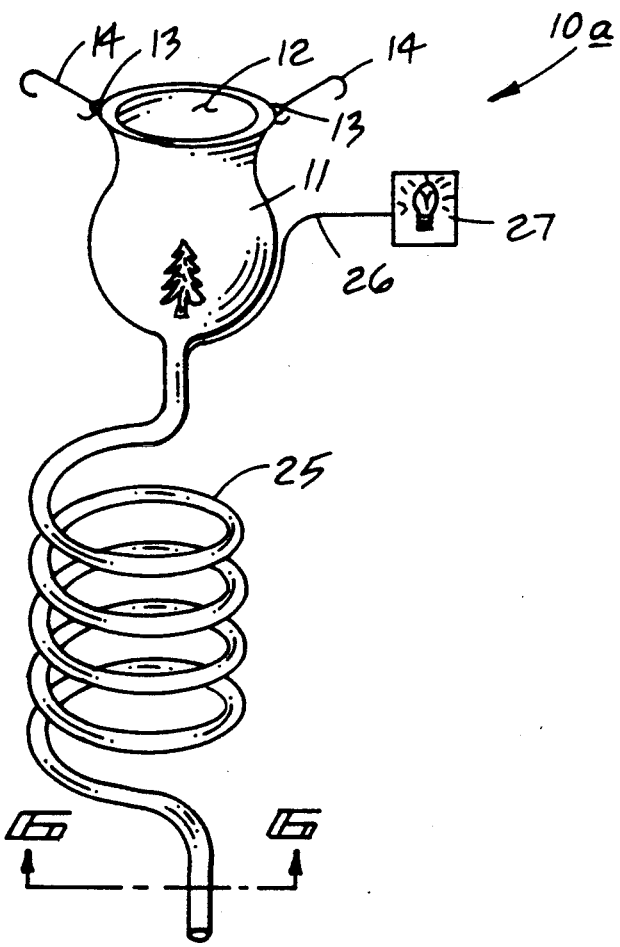
FIG. 5 is an isometric illustration of a modified ornament utilized by the instant invention.
Figure 6:
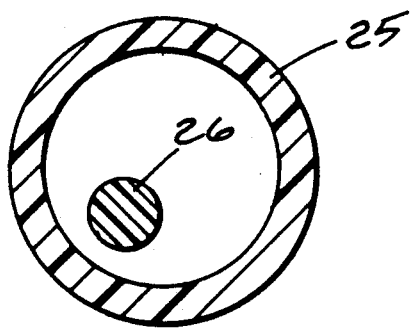
FIG. 6 is a cross-sectional view taken along the lines 6—6 of FIG. 5 in the direction indicated by the arrows.

FIG. 5 illustrates a modified Christmas tree self-watering ornament 10a wherein the reservoir 11 includes a translucent coiled delivery conduit 25 with a fiber optic cable 26 mounted therein in association with a light source 27 to direct light to the fiber optic cable to thereby illuminate the conduit 25 and enhance the aesthetic effect of the watering ornament 10a in harmony with the typical ornamentation utilized with a Christmas tree.

Figure 7:
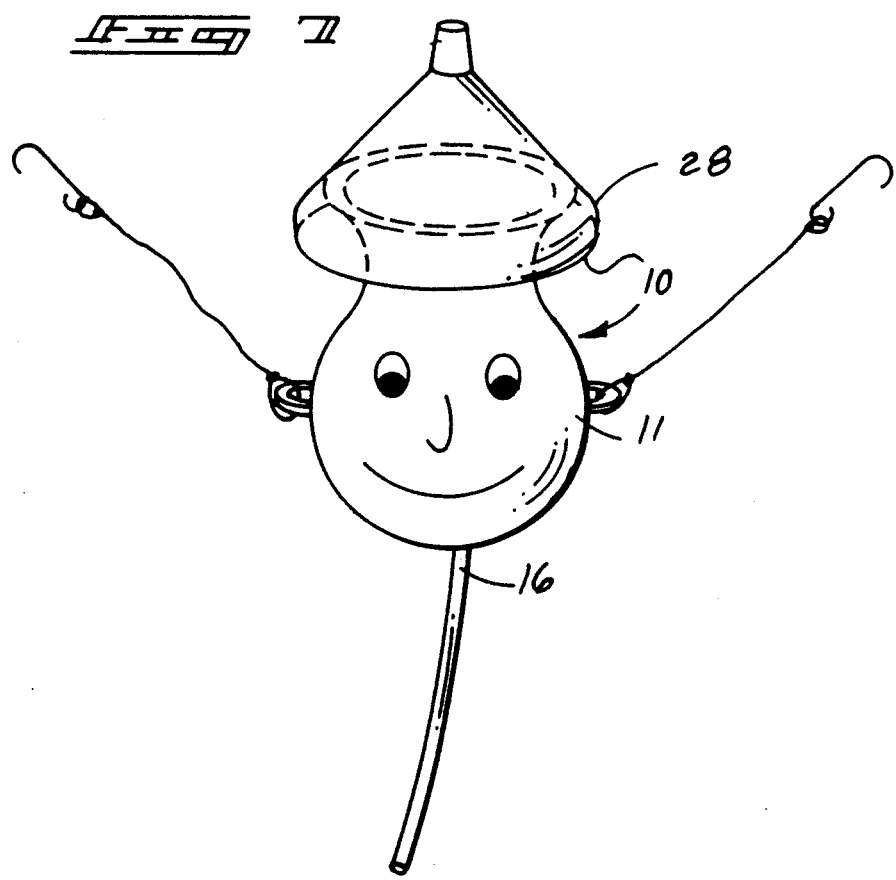
FIG. 7 is an isometric illustration of a modified lid utilized by the instant invention in a first position.
Figure 8:
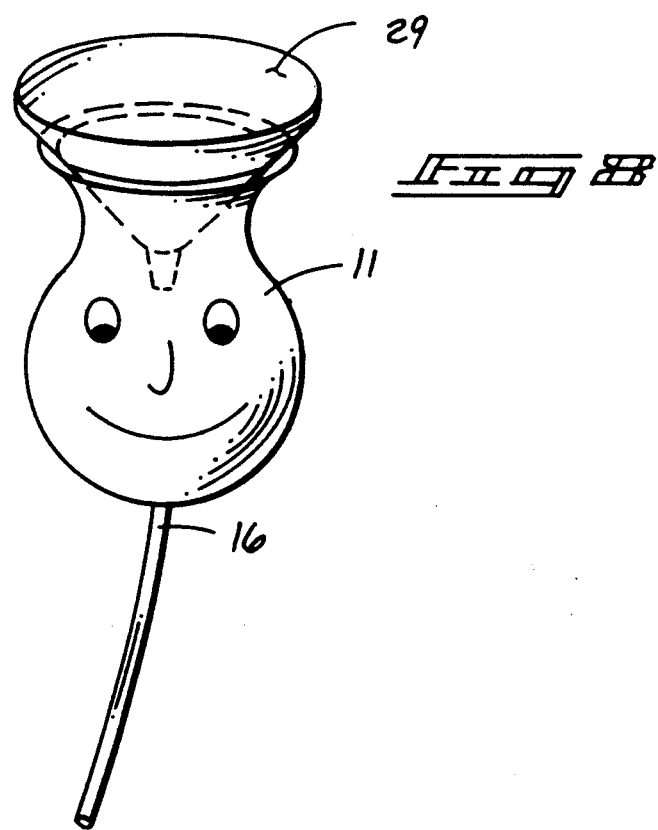
FIG. 8 is an isometric illustration of a modified lid utilized by the instant invention in a second position.

FIG. 7 illustrates a modified lid 28 configured as a funnel with a funnel inlet opening 29 defined by a funnel diameter greater than the predetermined diameter to overlie the open mouth 12, wherein the funnel is an inverted configuration in a first position, as illustrated in FIG. 7, and in use is directed interiorly of the reservoir 11 to assist in a filling procedure.

As such, the construction and use of the instant invention shall apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus for directing fluid to an associated plant comprising, an elongate reservoir for containing a quantity of fluid therein defined by an open upper end of a predetermined diameter, and an outlet aperture directed through a floor of said reservoir, and a conduit means in fluid communication with said outlet aperture to direct said fluid to said plant, and wherein the conduit means includes an elongate flexible tube defined by a lower outlet, the lower outlet medially and orthogonally formed through a lower web, and a plurality of peripheral outlets spaced through said lower web remote from said lower outlet, and an upper web spaced above the lower web containing an axially aligned upper web outlet coaxially aligned with the lower outlet, and the upper web and lower web defining a chamber therebetween spaced apart a predetermined distance, and a check ball captured within the chamber defined by a check ball diameter less than said predetermined distance, wherein said check ball is defined by a specific gravity less than that of said fluid for overlying said upper web aperture in a closed position and overlying said lower outlet in an open position to enable directing of said fluid to said plant, and wherein said conduit means is further defined as a coiled translucent tube, and further including a fiber optic filament captured within said tube, an upper end of said fiber optic filament operably associated with a light source to direct light through said fiber optic filament for visible illumination through said translucent tube, and further including a lid, said lid including at least one lid aperture therethrough, and wherein said lid aperture is coaxially aligned within said lid and slidably receives a buoyant elongate fluid level indicator slidably through said lid aperture for indication of fluid level within said reservoir.

2. An apparatus as set forth in claim 1 wherein said lid is defined by the predetermined diameter of said open upper end.

3. An apparatus as set forth in claim 1 wherein said lid is defined as a funnel, wherein an inlet opening of said funnel is defined by a funnel diameter greater than said predetermined diameter for overlying said open upper end in a first configuration and wherein said lid is inverted in a second position received within said open upper end for directing fluid interiorly of said reservoir.

* * * * *